/ Patented Dec. 12, 1933

1,939,018

UNITED STATES PATENT OFFICE 1,939,018

PROCESS OF MAKING OXIDATION PRODUCTS

William W. Odell, Pittsburgh, Pa.

No Drawing. Application November 22, 1929
Serial No. 409,194

23 Claims. (Cl. 260—172)

This invention relates to the "process of making oxidation products", from oxidizable matter, by the control, (usually incomplete) combustion of the latter in an internal-combustion engine.

The objects of the invention include:

1. The oxidation of hydrocarbons and other combustible matter by controlled combustion in an internal-combustion engine, and the recovery of valuable oxidation products from the products of combustion.

2. To cause catalytic oxidation of combustible matter to occur in an internal-combustion engine in the generation of power.

3. To recover valuable oxidation products resulting from the catalytic oxidation of combustible matter when used in the generation of power in an internal-combustion engine.

4. The production of preferred oxidation products in the combustion of motor fuel, when used in an internal-combustion engine, by the aid of catalysis; the catalyst may be gaseous, liquid, solid or combination of them. Other objects will become evident by the description.

In making oxidation products such as ethers, aldehydes, alcohols, phenols, chlorinated products and many other oxygenated products, considerable energy is usually expended. This process differs from others, so far as I am aware, in that power is generated by the controlled (usually incomplete) combustion of oxidizable matter in an internal combustion engine. In other words the pressure required or desired in conducting the reactions is generated by the partial oxidation of the oxidizable matter entering the reactions. For example in the use of methane ($CH_4$) as motor fuel, at least a portion of it can be oxidized as follows:

$$CH_4 + O_2 = H.C.HO + H_2O \quad (1)$$

also under some conditions a certain amount of alcohol is formed as follows:

$$2CH_4 + O_2 = 2CH_3.OH \quad (2)$$

The actual mechanism of the reactions are not believed to be quite as simple as the equations indicate but the results are as shown. The normal combustion of the gas is represented largely by Equation 3.

$$CH_4 + 2O_2 = CO_2 + 2H_2O. \quad (3)$$

A certain amount of CO is almost always present in burning hydrocarbons of this nature as motor fuel because of the slow rate of propagation of flame through a mixture of it with air. Furthermore there is a tendency for carbon and hydrogen to be formed by cracking when the amount of air supply is reduced below that necessary for complete combustion. These effects are indicated by Equations 4 and 5.

$$2CH_4 + 3O_2 = 2CO + 4H_2O \quad (4)$$

$$CH_4 \text{ contacting heated surface} = C + 2H_2 \quad (5)$$

Hydrogen and carbon monoxide as liberated by Equations 4 and 5 are chemically active and combine under definite conditions to form hydrocarbons, alcohols, aldehydes etc. The thermodynamics of these reactions is known to the inventor. Equations that typify these reactions include the following:

$$nCO + (2n+1)H_2 = C_nH_{2n+2} + nH_2O \quad (6)$$

$$2CO + 4H_2 = C_2H_4 + 2H_2O \quad (7)$$

$$nCO + 2nH_2 = C_nH_{2n} + nH_2O \quad (8)$$

$$CO + H_2 = HCHO \quad (9)$$

$$CO + 2H_2 = CH_3OH \quad (10)$$

These and similar reversible reactions, the equations of which could be written, are favored by increased pressure (pressures greater than atmospheric), and the rates of reaction are increased by catalysis. High temperatures, above 400° to 500° C. do not favor the production of hydrocarbons but rather their pyrolysis. However, in the confined combustion of mixtures of motor fuel with insufficient aeriform oxidizing agent for its complete combustion the products of combustion are momentarily highly active, probably ionized, and various reaction products form in the cylinders—initial combustion chambers—and during the cooling stage upon discharge from the engine. Compounds having fugitive existence only are formed, such as $CH_2$, $CH_3$ and others having unsatisfied valences which enter into chemical reaction with $H_2$, CO, $H_2O$ and $O_2$ forming more stable compounds such as $C_2H_4$, $C_2H_6$, $CH_3OH$, $CH_3CHO$ and HCHO. When benzole or its homologues is used as or in the motor fuel, $C_6H_5OH$ may also be found in the exhaust products under certain conditions.

In order to obtain particular end-products it is necessary to adjust conditions as well as select the motor fuel best adapted for the purpose. For example, the yield of benzole oxidation-products is greater when the motor fuel contains or comprises, benzole, napthalene, toluene and/or other benzene-ring compounds, than when the fuel comprises, $H_2$, $CH_4$ or mixtures of them.

The rate of propagation of flame through a mixture of gaseous fuel and an oxidizing agent such as air varies according to the percentage amount of each in the mixture, the amount of moisture in the mixture, and according to the initial temperature and pressure. The rate also varies according to the oxidizing agent used and the amount of inerts present. In the optimum operating condition for the economical production of both power and valuable by-products it is necessary to adjust these variables, which can be done by experiment. The optimum condition naturally varies according to the relative values of power, fuel and by-products.

Water vapor in controlled amounts is admitted with the motor fuel, as desired and when desired. Reactions such as those indicated by equations 6, 7 and 8 (left to right) are not favored by the presence of steam. However the yield of alcohols, aldehydes and acids is increased by the introduction of steam. The explanation offered for these phenomena, and believed to be correct is: the moisture retards the rate of combustion and maintains a lower average temperature in the system because of its high specific heat, and it enters into reaction with some of the unsaturated radicals such as $CH_2$ as well as with CO. Although the mechanism of some of the reactions is not thoroughly understood, the equations typifying results attainable include the following:

$$CH_2 + H_2O = CH_3OH \quad (11)$$

$$2CH_2 + H_2O = CH_3.O.CH_3 \quad (12)$$

$$CO + H_2O = HCOOH \quad (13)$$

$$2CH_2 + O_2 = 2HCHO \quad (14)$$

$$2CH_2 + CO + H_2 = CH_3.CO.CH_3 \quad (15)$$

The chief variables influencing results attainable by this process include:
(1) The kind or kinds of motor fuel used.
(2) Kind or kinds of oxidizing agent used.
(3) The relative amounts of fuel and oxidizing agent used.
(4) Percentage amount of inerts present in the mixed fuel and oxidizing agent, and the nature of the inerts.
(5) The amount of water vapor present in the fuel mixture.
(6) The initial and final pressure in the system.
(7) The initial and final temperatures attained in the gaseous mixture; before, during and immediately following ignition.
(8) Rate of cooling the products discharged from the primary combustion chambers of the internal combustion engine.
(9) The nature of the catalyst or catalysts employed.

The fuel used may be gasoline, benzene, toluene, combustible gas such as city gas, natural gas, propane, butane, pentane, atomized petroleum or its products, naphthalene, mixtures of these fuels or other fuels of similar nature including hydrogen, other hydrocarbons and powdered fuel.

The oxidizing agent may be air, oxygen enriched air, chlorine or other halogen, mixtures of them or compounds containing one or more of them that support combustion, that is, compounds that will react with and oxidize motor fuel under the conditions of combustion in an internal combustion engine. Nitric acid is an oxidizing agent and, when used in this process seems to function as a catalyst, probably because of the products formed from it in the combustion process.

The amount of fuel and oxidizing agent used depends on the results sought, the value of the power generated, cost of fuel, and other variables. Nevertheless the amount of oxidizing agent added is preferably less than that required by the equations for complete combustion. However there are some exceptions to this; in burning $H_2$ in $Cl_2$ it is possible to produce HCl or, if $O_2$ is also present it is possible to form an oxygenated product of the acid—an oxy-acid. It is usually preferable to have the hydrogen present in excess even in this instance, with respect to the compound formed. This is an example of an effect obtainable by the use of mixed oxidizing agents, that is by employing a plurality of them simultaneously. Both chlorinated and oxy-chlorinated products are considered to be "oxidation-products" as the term is used in this application. Although the optimum proportions of fuel and oxidizing agents desired will vary for different sets of conditions I prefer not to confine myself to particular limits other than that normally I use less oxidizing agent than is required for complete combustion to occur under the conditions prevailing. Operating as a gas engine, for example, I prefer, generally, to use less air or its equivalent than is used in its normal operation in the generation of power. In this connection it is desirable to call attention to the fact that the source of intensity of the initiating flame or spark has considerable bearing upon the results of combustion. In the ordinary operation of a gas engine a "hot spark" is necessary for the efficient generation of power; with a less intense source of ignition the combustion wave, or flame, is not properly propagated through the gas-air mixture—combustion and reaction is less complete. In my process I usually want complete reaction but in most instances not complete combustion. The reaction of $H_2$ with $Cl_2$ and $O_2$ is a case where complete combustion is desired with respect to the $Cl_2$. A very intense or less intense source of ignition may be used. The effect of changing from the one to the other is different with the various reactions and conditions. In general, when a slow-burning gas is being oxidized and in particular when appreciable amounts of inerts or $H_2O$ are present an intense source of ignition is desired.

The inerts which may be present as a constituent of the fuel used or of the oxidizing agent as the nitrogen in the air, are not necessarily a nuisance, in my process. They are frequently beneficial in retarding complete oxidization by the dilution effect and by reducing the destructive effect of excessive temperatures in the reacting gaseous fluids. Water vapor is an inert having a high specific heat and a retarding influence upon combustion. However it has another effect also; it changes equilibrium conditions. Its presence is more favorable in reactions which produce the minimum amount of water as an end-product. Furthermore water furnishes $O_2$ in some of the reaction products; therefore it is not merely and always a diluent but may be viewed also as an oxidizing agent. Carbon dioxide is another material having certain properties akin to those of water. Other inert gases or vapors or mists alone or in the mixtures may be used. The greater the percentage amount of diluent used the less power will be generated, other factors remaining the same, but the yield of incompletely oxidized products is increased by the use of inerts within certain limits. The limits are less than those defining the combustible range of gas-air mixtures, that is the range in gas-air proportions in mixtures through which flame will propagate itself.

It has been stated that pressure favors the production of many of the end-products sought. But pressure in an internal combustion engine is the direct result of the production of a high temperature in the combustion chamber; and prolonged exposure of some of the end-products to high temperature is not desired. A beneficial effect is derived from employing a high compression (initial pressure) and using diluents to prevent an excessive combustion temperature. The benefit thus derived is largely in the increase in yield of incompletely oxidized products.

It is usually preferable to cool the exhaust gases immediately after their discharge from the engine, for the purpose of preventing the destruction of certain unstable compounds.

The matter of generating power efficiently may be secondary to the production of maximum amounts of salable end-products, or it may be desirable to produce power and recover oxidation-products as by-products. Conditions are adjusted to suit the requirements. The maximum amount of power is not always attained simultaneous with the maximum yield of incompletely-oxidized products.

The catalyst may be gaseous only such as an oxide of nitrogen, ($NO_2$), $HNO_3$, or other gaseous product known to have catalytic properties, or it may be a finely divided solid admitted as a mist with the fuel or it may be both. A metal oxide or combination of metal oxides or chromates are catalysts to the combustion reactions. Copper and manganese oxides and zinc oxides catalyze combustion and metallic copper is catalytic to the formation of aldehydes. No attempt is made to list all of the catalysts which might be used in my process because the claims are confined to the process broadly. The properties of particular catalysts with respect to oxidization are fairly well known and much has been published on the subject. Many catalysts are poisoned by sulphur compounds but attention is called to the fact that aluminum oxide and chromium oxide are not thus affected; these materials catalyze hydration reactions.

In the efficient operation of gas engines in common practice, air is drawn into the combustion chambers along with the gaseous fuel in proportional amounts suited for the substantially complete combustion of the fuel. However it is known that some carbon monoxide, a product of incomplete combustion, is evolved and discharged in the exhaust gas. I do not claim this process of operating a gas engine as my own. I believe it is new to:

(1) Cause catalytic, preferential combustion in an internal-combustion engine.

(2) Cause the controlled formation of incompletely oxidized products other than CO in an internal-combustion engine; the products may accompany the formation of CO.

(3) Catalytically synthesize oxidation products simultaneous with the generation of power by controlled combustion in an internal-combustion engine.

(4) Use a plurality of oxidizing agents in combustion in an internal-combustion engine.

(5) Use diluents to retard combustion in an internal-combustion engine, in the formation of preferred oxidation products.

(6) Use water vapor in excess of amounts normally present in air in the combustion (catalytic or otherwise) of fuel in an internal-combustion engine in the production of preferred oxidation products. Normally, preferred oxidation products are other than $CO_2$, CO and $H_2O$; they include such materials as aldehydes, alcohols, acids including HCl and phenol.

When the temperature normally attained in operating an internal-combustion engine for the generation of power is too high for the optimum production of chosen end-products it is satisfactory to operate at a lower temperature without lowering the pressure by admitting the chosen fuel and oxidizing agent, with the desired amount of a chosen diluent, into some of the cylinders only of the engine, the remaining cylinders being supplied with the usual fuel-air mixture, the exhaust gases from the two sets of cylinders are preferably kept separate. In this manner it is possible to have incipient combustion occur at high pressure. In fact by controlling the relative amounts of the chosen diluent and by providing the preferred mixture of oxidizing agent with the chosen fuel the optimum condition for the production of high yields of the desired end-products can be attained.

The desired end-products produced in this process are recovered from the exhaust gas by methods not new in the field of chemical technology. The method may include absorption in a solvent, adsorption on a solid, chemical combination with other reactants, fractional condensation or combinations of them. In almost all cases it is desirable to cool the hot end-products rapidly after discharge from the combustion chambers.

The term oxidizing agent is used in the claims to mean matter capable of causing oxidation of oxidizable matter and it does not necessarily mean a single substance or element such as $O_2$, $Cl_2$ etc., but includes one or more such substance. Water vapor, when used with an oxidizing agent such as $O_2$ or $Cl_2$ may be considered as an oxidizing agent. When water is used strictly as a diluent the amounts used depend upon the temperature desired in the reaction. Increasing the amount of inerts or decreasing the initial pressure, other factors remaining the same, results in a lowering of the maximum temperature attained, and a slowing-up of the rate of combustion.

It is known that chlorine oxy-acids are not stable at elevated temperatures and the fact that they have been found in the end-products may only indicate that they were formed after the maximum temperature had been reached and passed, namely during cooling. Chlorinated products of unsaturated hydrocarbons formed during combustion can also be formed by this process, namely when chlorine and oxygen (air or oxygenated air) along with hydrocarbon fuels are introduced into the combustion chambers and when oxygen is present in insufficient amounts for the complete combustion of said hydrocarbons.

Carbon black is a by-product obtained under certain conditions, namely when hydrocarbons are used in appreciable excess. It should be noted that the black thus produced, when diluents are used and the pressure in the system is not excessive, is hard and similar to true carbon black and not like the socalled lamp-black sometimes formed when the air supply to a gas engine is throttled. Less carbon forms as dilution increases but the quality is improved.

Whereas it has been stated that temperatures above 400° C. do not favor the formation of hydrocarbons it is recognized that a definite amount of a given product may be formed at a temperature and under conditions which would favor an appreciable amount of pyrolysis of the same product if it alone was so exposed. In other words there is an equilibrium condition, different for each different temperature, for each reaction. Formaldehyde is said to be largely decomposed at temperatures above 450° C. Equilibrium computations support this conclusion. Nevertheless, it is a fact that when the temperature of the gases in the combustion chamber is 700° C. or higher a large percentage of the theoretical total yield of formaldehyde has been obtained in the exhaust gas. It is believed that this might be explained by the assumption that the reactions were not completed until a lower temperature was reached. Cognizance is taken of the fact that the pressure increases as the temperature increases. The high yield of formaldehyde referred to above, was obtained burning natural gas in air in a gas engine. Accurate temperature measurements are difficult to obtain and in this instance the temperature was computed from the gas composition and the temperature of the exhaust gas. Under the pressure conditions obtaining in the cylinders of a gas engine and the momentary exposure of the reacting gases to high temperature, it is possible to obtain in the reaction products, particularly if they are cooled immediately after discharge from the engine, partially oxidized products that would be decomposed with prolonged exposure at the said high temperature. Reactions whereby gases are decomposed at high temperatures are usually surface phenomena; this may be another reason why it is possible to obtain high yields of partially oxidized products in the manner described, the surface is small.

NO₂ has been named as a gaseous catalyst for the reaction CH₄+O₂=CH₂O+H₂O. Ammonia also is a catalyst, probably by reason of its combustion to NO₂ and H₂O. Having described my process, the matter which I believe to be new and on which I seek patent protection, I claim:

1. Process of making oxidation products from oxidizable matter by combustion in an internal-combustion engine, comprising admitting said oxidizable matter and an amount of an oxidizing agent insufficient for its complete combustion, into the combustion chambers of said engine, igniting the mixture, causing combustion to occur therein with the formation therein of incompletely oxidized products other than water and the oxides of carbon, removing said products from said engine in the exhaust gas, immediately cooling said gas and recovering at least one of them separate from the other components of said exhaust gas.

2. Process of making oxidation products from motor fuel by combustion in an internal-combustion engine, comprising admitting said motor fuel, with an amount of an oxidizing agent appreciably less than that required for its complete combustion, into the combustion chambers of said engine, igniting the mixture, causing detonation to occur therein with the formation therein of incompletely oxidized products other than water and the oxides of carbon, removing said oxidized products from said engine in the exhaust gas, preserving them by rapid cooling, and recovering at least one of them separate from the other components of said exhaust gas.

3. Process of making oxidation products from oxidizable matter by incomplete combustion in a combustion chamber of an internal combustion engine in the generation of power, comprising, introducing into a combustion chamber of an internal combustion engine, motor fuel and an amount of an oxidizing agent including water insufficient for the complete oxidation of said motor fuel, promoting the incomplete oxidation of said motor fuel in said combustion chamber thereby forming therein incompletely oxidized products other than water and an oxide of carbon simultaneously generating power by virtue of said incomplete oxidation of said motor fuel, removing said products from said combustion chamber, preserving them from thermal decomposition by immediately cooling them, and recovering at least one of said products separate from the other exhaust products.

4. Process of making oxidation products from oxidizable matter by combustion in an internal-combustion engine, comprising, admitting combustible matter, in a fine state of division, into at least one combustion chamber of said engine substantially simultaneously with the admission thereto of an oxidizing agent including water vapor, causing combustion to occur therein, with the formation of incompletely oxidized, unstable products, removing the latter products having lower vapor pressure than the oxides of carbon from said engine in the exhaust gas, rapidly cooling said gas immediately after exhaustion from said combustion chamber and recovering at least one of them separate from the remaining constituents of said exhaust gas, said oxidizing agent being admitted to said chamber in quantities insufficient for the complete combustion of said oxidizable matter.

5. Process of making oxidation products from oxidizable matter by combustion in an internal-combustion engine, comprising, admitting said combustible matter, in a fine state of division, into at least one combustion chamber of said engine substantially simultaneously with the admission thereto of an oxidizing agent including oxygen and water and an inert aeriform fluid comprising nitrogen, compressing the mixture, igniting the compressed mixture, causing the oxidation to occur therein with the formation of an incompletely oxidized product having a greater molecular weight than 28, removing the latter product from said engine in the exhaust gas, immediately rapidly cooling said gas and recovering said product separate from the other constituents of said exhaust gas, said oxidizing agent being admitted to said chamber in quantities insufficient for the complete combustion of said oxidizable matter.

6. Process of making oxidation products other than water and an oxide of carbon from oxidizable matter by combustion in an internal-combustion engine, comprising, admitting said combustible matter, in a fine state of division, into at least one combustion chamber of said engine substantially simultaneously with the admission thereto of an oxidizing agent in amounts insufficient for the complete combustion of said combustible matter, igniting the mixture, causing partial oxidation to occur therein with the formation of incompletely oxidized products other than carbon monoxide that are unstable at atmospheric pressure and exhaust gas temperature, removing them from said chamber in the exhaust gas, immediately rapidly cooling said gas and recovering at least one of them separate from the other constituents of said exhaust gas.

7. Process of making oxidation products from oxidizable matter by combustion in an internal-combustion engine, comprising, admitting said combustible matter in a fine state of division, into at least one combustion chamber of said engine substantially simultaneously with the admission thereto of an oxidizing agent and a catalyst, igniting the mixture, causing catalytic oxidation of said combustible matter to occur by virtue of said catalyst, with the formation of an incompletely oxidized product having a greater molecular weight than 28, removing said product from said engine in the exhaust gas, immediately cooling it and separating it from the other constituents of said exhaust gas; said catalyst having the property of catalyzing oxidation.

8. Process of making oxidation products from oxidizable matter by combustion in an internal-combustion engine, comprising, admitting said oxidizable matter in a fine state of division, into at least one combustion chamber of said engine substantially simultaneously with the admission thereto of an oxidizing agent, causing the resulting aeriform mixture to be compressed therein to a superatmospheric pressure, initiating combustion in the compressed mixture, causing an increase in the temperature of, and the pressure in, the reacting fluid, forming an unstable product of incomplete combustion of said oxidizable matter which product has a greater molecular weight than 28, removing it from said engine in the exhaust gas, immediately cooling said exhaust gas and recovering said product separate from the other components of said exhaust gas.

9. Process of making oxidation products from oxidizable matter by combustion in an internal-combustion engine during the generation of power: comprising, introducing into at least one combustion chamber of said engine, said oxidizable matter, a catalyst adapted to catalyze oxidation, and an amount of an oxidizing agent insufficient for the complete combustion of said oxidizable matter, compressing the aeriform mixture in said chamber, initiating and catalyzing combustion of said oxidizable matter while under pressure greater than atmospheric, forming products of incomplete combustion of said matter that are unstable at the temperature attending their formation, discharging the products of combustion from said chamber, immediately rapidly cooling them and separating therefrom at least one of the incompletely oxidized products having a greater molecular weight than 28.

10. Process of making oxidation products from oxidizable matter by combustion in an internal-combustion engine, comprising, introducing into at least one combustion chamber of said engine said oxidizable matter, an inert gas, an oxidizing agent, and a catalyst adapted to catalyze combustion, subjecting the aeriform mixture in said chamber to a pressure greater than atmospheric, igniting the mixture, initiating catalytic combustion of said oxidizable matter in said chamber while under pressure, thereby forming incompletely oxidized products that are unstable at the temperature attending their formation, discharging the products of combustion, rapidly cooling them and separating therefrom an incompletely oxidized product having a greater molecular weight than 28.

11. Process of making oxidation products from oxidizable matter comprising catalyzing incomplete combustion of said matter in a mixture with an oxidizing agent, in a cylinder of an internal-combustion engine, after igniting it by the application of an electric spark to said mixture, forming products of incomplete combustion of said matter that are unstable at the temperature attending their formation, discharging them from said chamber, immediately cooling them and separating from the products of combustion at least one incompletely oxidized product of said incomplete combustion other than carbon monoxide; said oxidizing agent being present in said mixture in an amount less than that required for the complete combustion of said matter.

12. Process of making oxidation products from oxidizable matter comprising catalyzing incomplete combustion and direct oxidation of said matter in a mixture with an oxidizing agent, while under pressure greater than atmospheric in a cylinder of an internal-combustion engine forming products of incomplete combustion of said matter that are unstable at the temperature attending their formation, immediately discharging them from said cylinder, immediately cooling them, and separating from the products of combustion at least one incompletely oxidized product of said incomplete combustion other than carbon monoxide; said oxidizing agent being present in said mixture in an amount less than that required for the complete combustion of said matter.

13. Process of making oxidation products from oxidizable matter, comprising, catalyzing incomplete combustion of said matter, in a mixture with an oxidizing agent in a combustion chamber of an internal-combustion engine, while under pressure greater than atmospheric and at a temperature of the order of 500° C. forming a plurality of incompletely oxidized products withdrawing the reaction-products from said chamber, immediately cooling them and separately recovering therefrom one of said incompletely oxidized products having a greater molecular weight than 28; said oxidizing agent being present in said mixture in an amount less than that required for the complete combustion of said matter.

14. Process of making oxidation products from oxidizable matter comprising catalyzing incomplete combustion of said matter, in a mixture with an oxidizing agent in a combustion chamber of an internal-combustion engine, while under pressure greater than atmospheric and at a temperature of the order of 700° C., thereby forming incompletely oxidized products simultaneously generating power, withdrawing the reaction-products from said chamber, immediately cooling them and separately recovering therefrom one of said incompletely oxidized products having a greater molecular weight than 28; said oxidizing agent being present in said mixture in an amount less than that required for the complete combustion of said matter.

15. Process of making oxidation products from hydrocarbon compounds, comprising, catalyzing the incomplete combustion of said hydrocarbons in a mixture with an oxidizing agent containing $O_2$ in a combustion chamber of an internal-combustion engine while under pressure greater than atmospheric, thereby generating power and simultaneously forming incompletely oxidized products including an aldehyde, immediately cooling the reaction products, and separating said aldehyde from other products of combustion discharged from said engine.

16. In the process of making oxidation products simultaneous with the generation of power, by the incomplete combustion of fuel in a combustion chamber of an internal-combustion engine and discharging the reaction products, the steps consisting in catalyzing said combustion of said fuel in the combustion chamber of said engine when mixed with an insufficient amount of an oxidizing agent for its complete combustion, and suddenly cooling the reaction products immediately after their discharge from said chamber.

17. In the process of making oxidation products simultaneous with the generation of power, by the incomplete combustion of combustible matter in a combustion chamber of an internal-combustion engine, and discharging the reaction products, in combination the steps comprising, catalyzing said combustion of said matter when mixed with an insufficient amount of an oxidizing agent for its complete combustion while under pressure greater than atmospheric, and suddenly cooling the reaction-products immediately after their discharge from said chamber.

18. In the process of making oxidation products simultaneous with the generation of power, by the incomplete combustion of combustible matter in a combustion chamber of an internal-combustion engine, and discharging the reaction products, in combination the steps comprising, catalyzing said combustion of said matter at a temperature approximately 400° to 700° C., when mixed with an insufficient amount of an oxidizing agent for its complete combustion and when under pressure greater than atmospheric, discharging the reaction products and suddenly cooling them immediately thereafter.

19. In the process of making oxidation products by the incomplete combustion of combustible matter in a combustion chamber of an internal-combustion engine and discharging the reaction products, in combination, the step comprising catalyzing said combustion of said matter when mixed with an insufficient amount of an oxidizing agent for its complete combustion, while under pressure greater than atmospheric but at a temperature of about 400° to 700° C., and the step of rapidly cooling the products immediately subsequent to discharge from said engine for the purpose of preserving unstable products.

20. Process of making oxidation products from oxidizable matter, comprising, initiating combustion in a compressed mixture of the vapor of said matter and the vapor of an oxidizing agent while confined in a combustion chamber of a gas engine, causing reaction to occur in said mixture under said pressure forming unstable compounds of hydrogen, carbon and oxygen, exhausting reaction products from said chamber, immediately cooling the reaction products to a temperature low enough to prevent thermal decomposition of them, and recovering an oxidation product therefrom other than water and an oxide of carbon.

21. Process of making oxidation products from oxidizable matter, comprising, initiating combustion in a compressed mixture of the vapor of said matter and an oxidizing agent comprising a halogen, causing reaction to occur between said halogen and said matter with the formation of a halogen compound, cooling the reaction products to prevent their thermal decomposition and separating said compound from other reaction products.

22. Process of making oxidation products from oxidizable matter, comprising, initiating combustion in a compressed mixture of an oxidizing agent comprising chlorine gas, and the vapor of a hydrocarbon, causing reaction to occur in said mixture while under superatmospheric pressure forming a chlorine compound, cooling the reaction products to prevent their thermal decomposition and recovering said chlorine compound.

23. Process of making oxidation products from oxidizable hydrocarbon compounds, comprising, initiating combustion in a compressed mixture of a hydrocarbon vapor and the vapor of a halogen, causing reaction to occur with the formation of a hydrogen-carbon-halogen compound, cooling the products of reaction to prevent their thermal decomposition and separating said compound therefrom.

WILLIAM W. ODELL.